US005582905A

United States Patent [19]
Beck et al.

[11] Patent Number: 5,582,905
[45] Date of Patent: Dec. 10, 1996

[54] POLYESTER INSULATION

[76] Inventors: Martin H. Beck, 316 Baboosic Lake Rd., Merrimack, N.H. 03054; George F. Rollend, 38 Green Rd.; Lydia K. Reed, 26 Standish Way, both of Amherst, N.H. 03031; Marshall T. Watson, 1700 Long View St., Kingsport, Tenn. 37660; David W. Arseneau, #309-5080 Pinedale, Burlington, Ontario, Canada, L7L 5V7

[21] Appl. No.: 492,473

[22] Filed: Jun. 22, 1995

Related U.S. Application Data

[63] Continuation of Ser. No. 250,712, May 26, 1994, abandoned.

[51] Int. Cl.$^6$ ........................................... D04H 3/16
[52] U.S. Cl. .................. 428/286; 428/298; 428/284; 428/287; 428/297; 428/299; 428/904; 428/904.4; 428/913; 428/74; 428/296
[58] Field of Search .................................... 428/298, 284, 428/286, 287, 297, 299, 904, 904.4, 913, 74, 296

[56] References Cited

U.S. PATENT DOCUMENTS

| T100,902 | 8/1981 | Hauser . | |
|---|---|---|---|
| 2,416,390 | 2/1947 | Hitt . | |
| 2,859,506 | 11/1958 | Slayter . | |
| 2,958,113 | 11/1960 | Lauterbach | 428/300 |
| 3,016,599 | 1/1962 | Perry, Jr. . | |
| 3,560,326 | 2/1971 | Bunting et al. . | |
| 3,692,618 | 9/1972 | Dorschner et al. . | |
| 3,763,521 | 10/1973 | Ricketts . | |
| 3,795,571 | 3/1974 | Prentice . | |

(List continued on next page.)

OTHER PUBLICATIONS

Otis L. Shealy, Spunbonded Products–A New Concept in Utilization of Fibrous Materials, pp. 322–329, Textile Research Journal.
C. W. Ericson and J. F. Baxter, Spunbonded Nonwoven Fabric Studies, vol. 43, pp. 371–378.
Eckhard C. A. Schwarz and Thomas M. Holliday, An update and New Concepts in Melt Blowing Nonwovens.
Eckhard C. A. Schwarz, Melt–Blown Fibers in High–Loft Applications, pp. 1–10.
Wayne P. Sorenson, Microdenier Fibers: A Progress Report, pp. 29–30, Fiber Producer/Feb. 1984.
John Skelton, James G. Donovan & DeWitt R. Petterson, Synthetic Fiber Alternatives to Waterfowl Down, Section I–1–Section I–21, Fiber Developments/Polymer Based Nonwovens Conference, Feb. 22–24, 1987.
W. A. Haile and M. F. Meyer, Adhesive and Matrix Polyester Melt–Down Webs, entire document.
Eckhard C. A. Schwarz, New Dual Melt–Blowing System for Composite and Multi–Layered Webs, pp. 73–81, Edana's 1988 Nordic Nonwovens Symposium Stockholm, Sweden, Jun. 7 and 8, 1988.
Meltblowing Leads Evolving Nonwovens Technologies, Nonwovens World 29, Aug. 1990.
Maureen Dever, Larry C. Wadsworth and Youngchul Lee, Melt Blown Webs of Recycled Poly (Ethylene Terephthalate), INDA JNR vol. 3, No. 1 pp. 19–24.
J. D. Ned Nissan, Plastic Batts From Recycled Bottles Successfully Demonstrated, Energy Design Update, vol. 13, No. 9 pp. 12–13.

*Primary Examiner*—Marion E. McCamish
*Assistant Examiner*—Kathleen L. Choi
*Attorney, Agent, or Firm*—Davis, Bujold & Streck, P.A.

[57] ABSTRACT

A non-woven mat of fibrous thermoplastic insulation is produced by melt blowing recycled polyethylene teraphthalate (PET). The PET is melted, pressurized and extruded from an extrusion head into substantially continuous fibers that are subjected to turbulent high velocity air that attenuates the fibers. The fibers are then collected on a collection device building up a non-woven mat. The collection device is spaced from the extrusion device forming a flight path for the fibers that is sufficiently long that the fibers split apart under the force of the high velocity air, fibrillating into a plurality of very fine fibrils of under 15 microns in diameter. These fibrils are analogous to goose down and greatly enhance the loft and R value of the mat.

25 Claims, 7 Drawing Sheets

U.S. PATENT DOCUMENTS

| | | |
|---|---|---|
| 3,849,241 | 11/1974 | Butin et al. . |
| 3,917,448 | 11/1975 | Wood . |
| 3,929,542 | 12/1975 | Gehrig et al. . |
| 4,041,203 | 8/1977 | Brock et al. . |
| 4,118,531 | 10/1978 | Hauser . |
| 4,166,877 | 9/1979 | Brandon et al. . |
| 4,196,245 | 4/1980 | Kitson et al. . |
| 4,359,445 | 11/1982 | Kane et al. . |
| 4,375,446 | 3/1983 | Fuji et al. . |
| 4,380,570 | 4/1983 | Schwarz . |
| 4,476,186 | 10/1984 | Kato et al. . |
| 4,588,635 | 5/1986 | Donovan . |
| 4,666,763 | 5/1987 | King et al. . |
| 4,681,789 | 7/1987 | Donovan et al. ................. 428/93 |
| 4,744,810 | 5/1988 | Battigelli et al. . |
| 4,818,463 | 4/1989 | Buehning . |
| 4,818,464 | 4/1989 | Lau . |
| 4,847,125 | 7/1989 | Schwarz . |
| 4,855,179 | 8/1989 | Bourland et al. . |
| 4,950,531 | 8/1990 | Radwanski et al. . |
| 4,988,560 | 1/1991 | Meyer et al. ................. 428/297 |
| 5,068,141 | 11/1991 | Kubo et al. . |
| 5,075,068 | 12/1991 | Milligan et al. . |
| 5,101,064 | 3/1992 | Dupont et al. ................. 560/78 |
| 5,141,699 | 8/1992 | Meyer et al. . |
| 5,207,970 | 5/1993 | Joseph et al. . |
| 5,236,771 | 8/1993 | Groshens ................. 428/198 |
| 5,248,247 | 9/1993 | Rubhausen et al. . |
| 5,260,003 | 11/1993 | Nyssen et al. . |
| 5,296,286 | 3/1994 | Allen et al. . |
| 5,298,315 | 3/1994 | Fukui et al. . |
| 5,298,321 | 3/1994 | Isuda et al. ................. 428/288 |

POLYESTER INSULATION

This is a continuation of application Ser. No. 08/250,712 filed on May 26, 1994 now abandoned.

BACKGROUND OF THE INVENTION

This invention relates to fibrous non-woven thermal insulating mats constructed of thermo-plastic fibers and particularly, though not exclusively, to high loft batts of linear condensation polymers, preferably polyester, for example, polyethylene teraphthalate (PET).

In the past, the production of polyester (e.g. PET) non-woven insulating mats constructed by melt-blowing techniques and R values of 4.0 or more per inch with mats using substantially continuous fibers of 3–12 microns have been suggested as possible. However, the production of high-loft batts suitable for the insulation of building structures have not proved easy to manufacture and mass production of such batts has not been achieved in spite of the research time and money devoted to producing such environmentally friendly products.

Low performance fibrous insulating materials have existed for decades, albeit exclusively for non durable goods. These uses continue to be the largest application for recycled PET and are commonly called FIBERFILL. In the 1960's 3M and others studied replacing fiber glass with plastic fibers but failed to develop high enough R-Values/inch to succeed commercially.

Meanwhile, the trend to conserve energy has increased standards for thermal performance. This has combined with rapidly escalating prices for lumber, other building components and labor costs to significantly increase demand for insulation with thermal resistance above R 4.0/inch.

Prototype prior art PET non-woven high loft batts have been quite thin (typically ⅛ inch thick and rarely over ½ inch thick). The problem of achieving high-loft batts having appropriate structural integrity has been the subject of much discussion in the prior art without a satisfactory solution being found. The prior art suggests that high-loft non-woven polyester batts may be produced, for example, by the use of bonding agents, adhesives, thermo-bonding fibers together, lamination, crimping fibers before batt formation, mixing thin fibers (required for good thermal insulation) with thicker fibers to provide structural integrity and resilience. None of the prior art proposals have been established as practical in a production environment capable of producing high-loft insulating batt at an acceptable cost.

The problems that have, until the present invention, defeated research and development are due to the incompatibility of the thin fibers, necessary for the desired insulation values, with the structural integrity, resilience, loft, compressive, tensile and burst strength etc. required of a practical high-loft insulation batt, plus the fibers have the tendency to form purely laminar structures, with no Z-direction orientation, that are not useful as batt insulation.

In addition, the prior art has only addressed the formation of simple polyester mats and has not addressed the formation of integral skins, special shapes, structural boards etc. from such materials.

SUMMARY OF THE INVENTION

It is an object of the present invention to provide a non-woven thermoplastic fiber mat capable of being produced in a high-loft batt form, typically well over ½ inch thick, with sufficient integrity, resilience, strength and insulating value, in production quantities at an installed cost that is competitive with currently available insulation, for example, fiber glass mats.

It is an object of the present invention to provide such a mat with an integral skin which may be formed as desired, impervious to fluids, structural, on one, both or all surfaces of the mat, integrated into the mat etc.

It is an object of the present invention to provide such a mat constructed of PET, for example, recycled PET with or without an integral PET skin or skins.

It is an object of the present invention to provide such a mat which is environmentally acceptable, not hazardous, recyclable, user friendly, versatile.

It is an object of the present invention to provide such a mat with an R value of at least 3.5 (preferably at least 4.0) per inch.

It is an object of the present invention to provide such a mat in desired shapes including shapes to at least partially encompass building structures and shapes which are formed or formable for desired specialized uses, for example, as semi rigid automobile hood liners.

The core technical challenge overcome by the present invention is that fibers below 20 microns in diameter are difficult and expensive to make, but under the proper circumstances are capable of creating insulating structures with thermal resistance greater than R 3.5/inch. Unfortunately they are fragile and lack sufficient strength to create a stable batt.

Larger durable fibers can be readily produced at low cost but only allow insulating structures with less than R 2.9/inch thermal performance. Below 10 microns in diameter the loss in physical properties of the insulating structure as a result of poor individual fiber strength is extremely pronounced.

Producing high quality micro fibers (below 10 microns in diameter) is complicated by variations in molecular weight (hence melt viscosity, shear and fiber properties) inherent in waste PET raw materials.

According to the invention there is provided thermal insulation comprising a non-woven mat of substantially continuous entangled thermoplastic fibers that extend primarily in X and Y directions of an X, Y, Z coordinate system with at least 1% of the extension of the fibers being oriented in a Z direction, such that the entanglement of the fibers is capable of providing all desired integrity of the mat.

According to the invention there is also provided a process of producing thermoplastic fiber thermal insulation mat comprising the steps of a) extruding dry molten thermoplastic through a row of apertures in a die forming the thermoplastic into substantially continuous fibers; b) attenuating the extruded fibers by extruding them into a stream of high velocity air which has been heated to a temperature above the melting temperature of the thermoplastic, such that the high velocity air places the extruded fibers under stress and attenuates the fibers; and c) collecting the extruded fibers on a collection device, wherein the row of apertures is spaced from the collection device forming a flight distance for the extruded fibers which is sufficient to subject the fibers to the high velocity air for long enough to cause the individual fibers to split apart, fibrillating into a plurality of fine fibrils to promote fiber entanglement to provide structural integrity of the insulation.

According to the invention there is also provided thermoplastic insulation produced by the process comprising the steps of a) extruding molten thermoplastic through a row of apertures in a die thereby forming the polymer into substantially continuous fibers; b) attenuating the extruded fibers by extruding them into a stream of high velocity air which has been heated to a temperature above the melting temperature of the polymer, such that the high velocity air places the fibers under stress attenuating the fibers are attenuated to diameters of about 3 microns to about 12 microns; and c) collecting the extruded fibers on a collection device located below the row of apertures and building up a non-woven batt by forming a plurality of micro-layers of fibers, layer by layer, by moving the collection device back and forth beneath the apertures, wherein each micro-layer is formed of two or more fibers that extend primarily in X and Y directions with at least 1% of the extension of the fibers being formed of segments that generally extend in a Z direction perpendicular to the X and Y directions.

According to the invention there is also provided an apparatus for producing thermal insulation in the form of a non-woven mat of substantially continuous entangled thermoplastic fibers, the integrity of the bat being provided solely by the entanglement of the fibers, wherein the apparatus comprises an extrusion head having a housing containing a die with a row of apertures in the die, with a 30 mil gap between the housing and the die on opposite sides of said die; a means for melting and pressurizing a supply of thermoplastic; a means for supplying the pressurized molten thermoplastic to the die such that the molten thermoplastic is extruded through the apertures forming said substantially continuous thermoplastic fibers; a means of heating and pressurizing air and supplying the heated pressurized air to the housing such that the pressurized air is forced through the gap, the gap being configured to form a high velocity stream of air that exits the housing and impacts opposite sides of the extruded fibers at an angle thereby attenuating the fibers, a collecting device spaced from the extrusion head a distance large enough that the fibers split apart under the force of the high velocity air, fibrillating into a plurality fibrils.

The insulating mats disclosed in this specification provide superior thermal and acoustical performance in commercial, residential, industrial and engineering applications and can be readily molded to desired application oriented shapes. They can be manufactured from recycled materials, are recyclable and are environmentally safe during manufacture, storage, transport, application and use.

Broadly the materials used are substantially continuous fibers of a thermoplastic usually a linear condensation polymer formed into non-woven mats not requiring adhesives or binders for structural integrity and are capable of incorporating an integral skin on one or both faces.

The preferred material is recycled polyethylene teraphthalate (PET). However, other high temperature engineering thermoplastics usually linear condensation polymers, including nylon, are potentially useful, particularly those having a melting point of at least 180° C.

While the balance of this specification will address insulating mats in the form of batts and boards made from PET fibers, it will be appreciated that the bulk of the matters presented in that context are also applicable to other "potentially useful" thermoplastics including linear condensation materials and high temperature engineering thermoplastics.

Experiments have established the viability of the PET non-woven fiber adhesiveless mat forming technology of the present invention and prototype samples of super high loft insulating batts and low loft insulating boards have been successfully produced. Preliminary data suggests that the sample batts have an R value well in excess of 3.5 per inch, perhaps as high as 4.8 per inch, and that the sample boards have an R value of 3 or more per inch coupled with superior board stiffness and strength. It is well established that PET fibers are environmentally safe and can be repeatedly recycled. In addition, material production and installation cost analysis indicates that the superior characteristics of PET fiber insulation, as compared with fiberglass insulation, can be achieved for about the same cost/R value as its inferior competitor.

The process of the present invention uses pellets or flakes of PET which are delivered, stored and transported to the processing area as required. PET must be dried to very low levels of water content (below 0.005% prior to melting to avoid degradation. The polymer is extruded through small apertures in a die into a stream of near sonic velocity air which has been heated to the polymer processing temperature (melt-blowing).

This air stream attenuates the fiber prior to quenching while the extreme turbulence intertwines the individual fiber strands. By increasing the distance between the extrusion head and the fiber collection device, relative to the prior art, the fibers are subject to the stress, strain and turbulence placed on them by the high velocity turbulent air for a longer period of time. As a result, the individual fibers split apart (fibrillate) to form many fine twisted connected fibrils. These fibrils can have a diameter under 15 microns and form a structure of entangled fibers similar to goose down, that greatly increases the loft and R value of the batt to levels greater than 3.5. Air is then removed resulting in a three dimensional structure created without adhesives or thermal bonding. Subsequently, this structure is built up, formed, sized, cut and packaged for shipment.

By managing the raw materials, blending selectively and coordinating these steps with the processing variables, the weaknesses of recycled PET are turned into strengths. Although the lowering of raw materials costs is important, the significant benefit is to broaden the scope of waste PET raw materials which can be used.

After melt-blowing the fibers may be collected by a collection device which reduces the laminar distribution of the fibers. This is done by increasing the z-direction fiber component creating a more random three dimensional structure. As a result there are air management, mechanical and spatial elements to the new designs. Without this unique technology, the resulting structure would be limited to the 0.5 inch thickness laminar structure of the prior art and have no advantage over mineral fibers in thermal performance.

Closely associated with the collection device is the forming step where additional thickness and loft are created. This step is unique as no adhesives or additional materials are introduced. It also allows for batt, board and composite products to be produced from the same die assembly and collection device. Without this unique technology additional materials would be required to manufacture these products increasing costs.

Sizing eliminates the need for additional materials and allows for the optional lamination of facing also made from PET which can control vapor and air permeability. This step also allows for the batt to meet the friction fit standards in stud wall construction. Without this unique component, additional materials would be required to install the material in walls increasing costs and compromising recyclability.

BRIEF DESCRIPTION OF THE DRAWINGS

The invention will now be described, by way of example, with reference to the accompanying drawings, in which.

DESCRIPTION OF PREFERRED EMBODIMENTS

Figure 1:
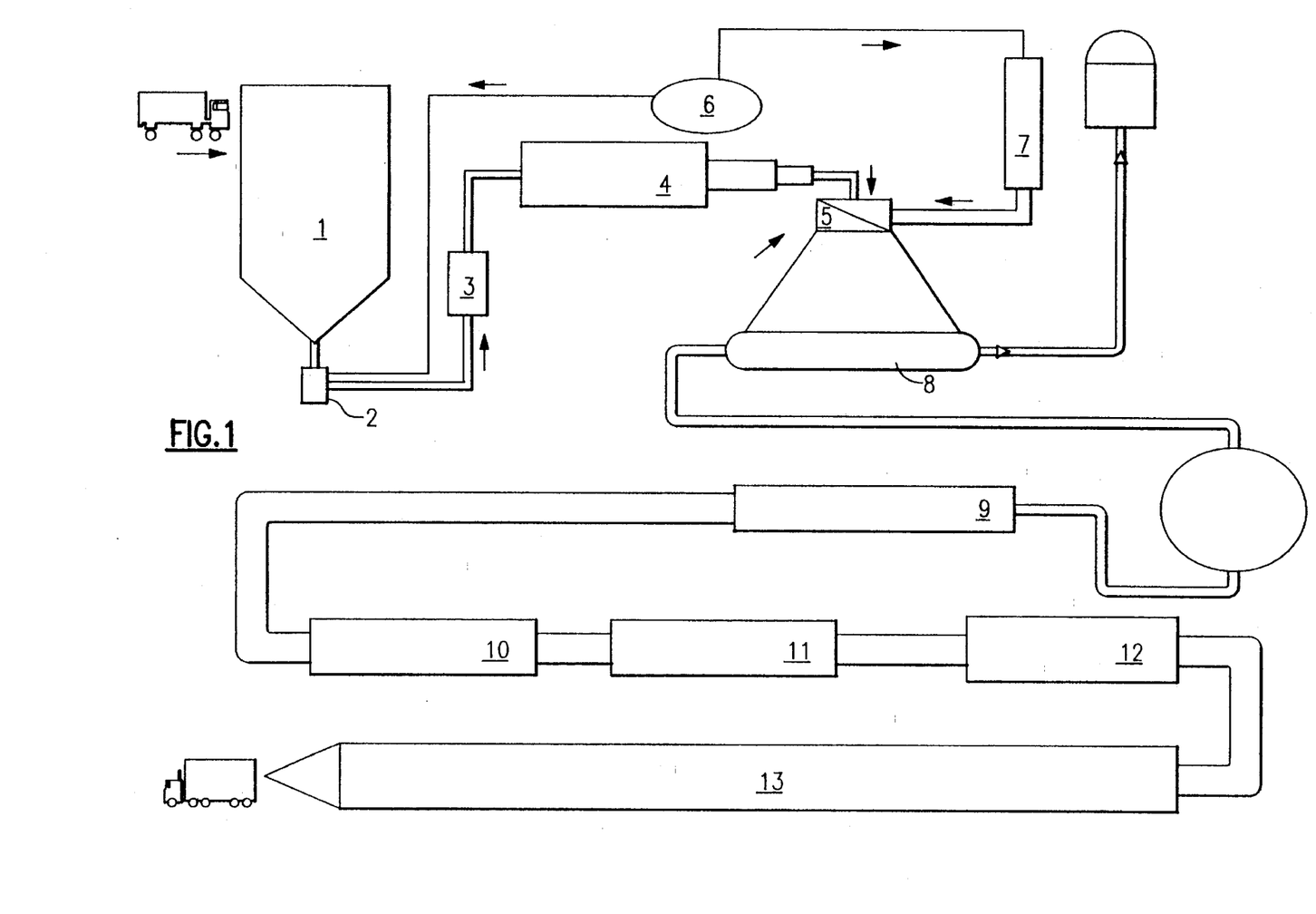
FIG. 1 is a diagrammatic representation of a PET mat production plant incorporating aspects of the present invention.

With reference to FIG. 1 a production plant for manufacturing high-loft PET fiber insulation batts of the present invention comprises a silo 1 for receiving and storing recycled PET for transport by a conveyor 2 through a drier 3 to an extruder 4 where the PET is melted for supply under pressure to a melt-blow extrusion head 5. An air compressor 6 supplies pressurized air to the silo-conveyor system 1, 2 and, by way of a heater 7, to the extrusion head 5 to provide the required high-velocity high-pressure air used in conjunction with the extrusion head 5 to assist in the forming shaping and transport of fibers extruded therefrom for collection on a conveyor at a collection station 8.

The batts may be shaped and integral skin(s) formed at the collection station 8 while at this station, during the transport to and/or collection thereat, fiber shaping, heat treatment, orientation etc. may be accomplished to provide the desired characteristics of the batts of the present invention.

From the collection station 8 the formed batt is conveyed to and through a forming station 9, facing station 10, sizing station 11, packaging station 12 to storage and dispatch 13. The stations 9–12 may be utilized to accomplish shaping, skin formation and/or skin shaping, trimming to size etc. as required to supplement the operations performed at the collection station 8.

Thermal losses through building cavities involve radiation, convection and conduction with radiation constituting a major portion (perhaps 80% or more) of the loss. The design of thermal insulating batts must address all three of the losses with relatively small improvements (perhaps only 10%) in performance being important. In this context it will be appreciated that structural costs can be reduced where higher R values per inch allow the same thermal performance from thinner wall structures. By the same token, greater thermal performance can be obtained from the same wall thickness when R value per inch is increased. The result here is a reduction in energy needs with associated cost savings and a potential lowering of the environmental impact of energy production.

Test samples of high loft adhesiveless recycled PET non-woven batts made from substantially continuous fibers have exhibited R values in excess of 4 per inch. In fact, R values in excess of 4.5 per inch have been achieved with batt densities and fiber diameters chosen from the ranges:

Batt Density 1–3 lb/ft$^3$; and

Fiber Diameter 3–15 microns.

Figures 2, 4A:
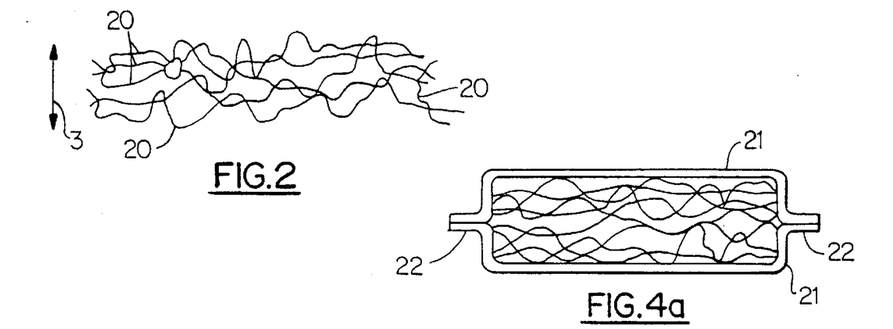
FIG. 2 diagrammatically illustrates a fragmentary cross-section of a high-loft batt of the present invention.
FIGS. 4a and 4b diagrammatically illustrate a cross-section of two shaped batts of the present invention.
Figure 13:
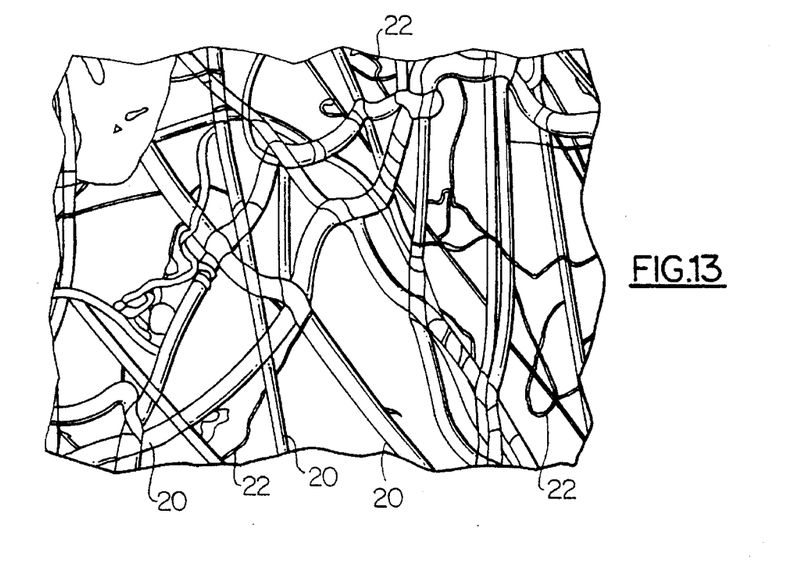
FIGS. 13 through 15 are magnified photographs of the fibers in a batt according to the present invention.
Figure 14:
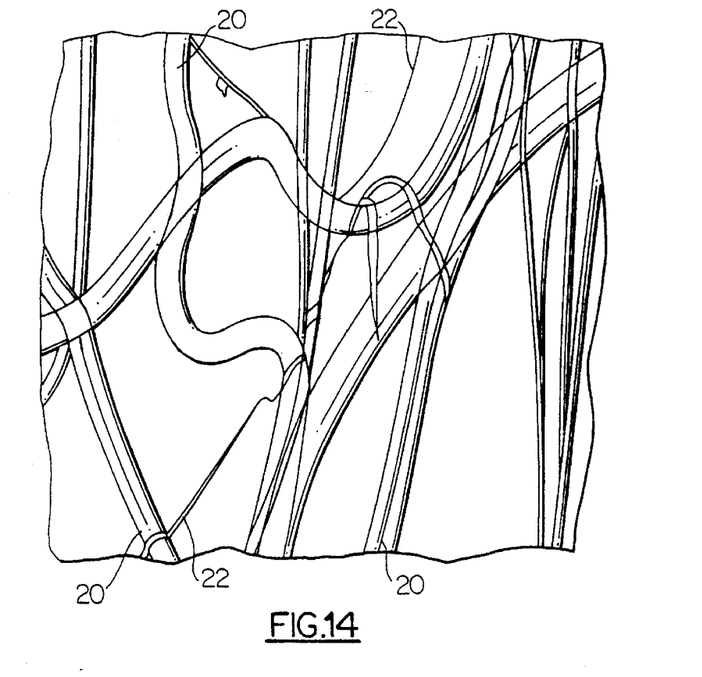

FIG. 2 diagrammatically illustrates a fragmentary cross-section of a high-loft batt of the present invention. Substantially continuous fibers 20 extend primarily in the X & Y coordinate directions with in excess of 5% of their extension being in the Z coordinate direction with the fibers interacting to provide entanglement, the desired loft, resilience, strength of batts and absence of fallout of the present invention without the use of bonding materials, adhesives or thermal bonding of the fibers. In the magnified photographs of FIGS. 13–15 the interaction and entanglement of the fibers can be seen.

Low-loft insulating boards of similar construction to the higher loft batts, using fibers of 1–15 microns and densities of 3 or more lb/ft$^3$, are able to provide R values of at least 3 per inch coupled with structural integrity and the required stiffness for such boards.

The batts and the boards can both be formed with integrally formed skins on one or both faces. These skins may readily be vapor or liquid impervious, structural, formed into desired non-planar shapes or patterns, textured, etc., in order to provide, for example, vapor barriers, dimensional control, stiffness, tensile strength, columnar support strength, attachment ears or flanges (element 22 in FIGS. 4a, 4b), stud encompassing shapes (see FIG. 5), structural surface arrangements (see FIG. 6), internal reinforcement (see FIG. 7), water and chemical resistance, bonding surfaces (important for cavity construction and lamination), metallizable/coatable surfaces, printable surface, reduced convection, aesthetics and/or elimination of pills.

Figure 3A:
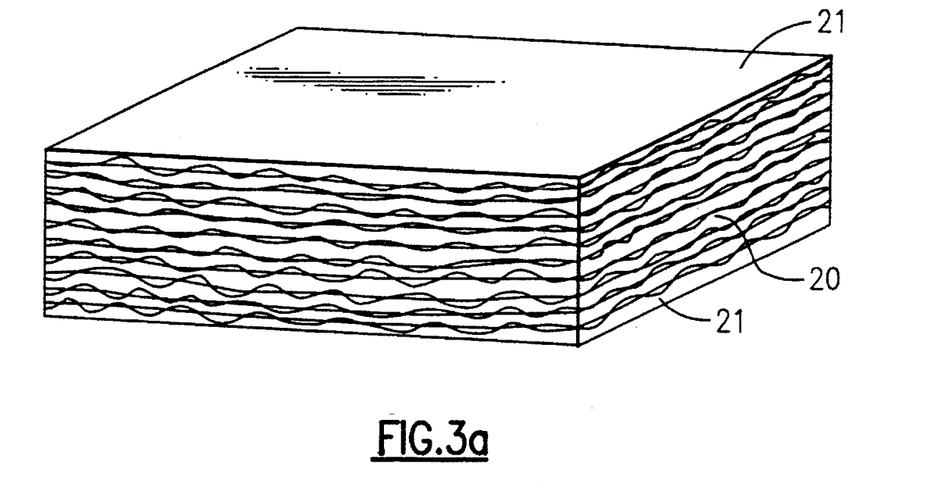
FIG. 3a diagrammatically illustrates a fragmentary cross-section of a high-loft batt of the present invention with integral skins.
Figure 3B:
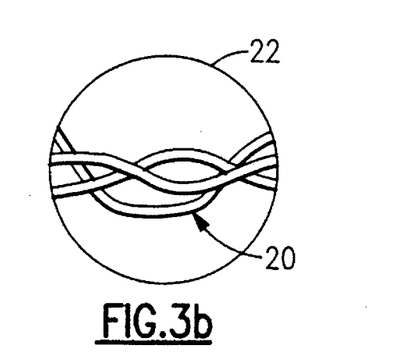
FIG. 3b diagrammatically illustrates fibers having a Z-direction component in an individual micro-layer.
Figure 3C:
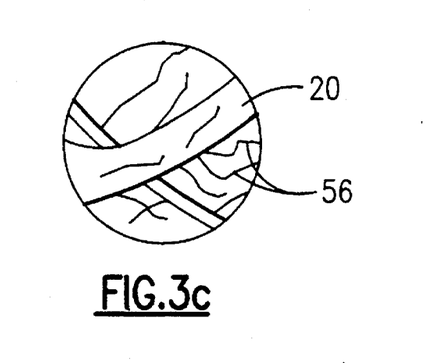
FIG. 3c diagrammatically illustrates fibrils present but not shown in FIG. 3b.

FIG. 3a, 3b and 3c diagrammatically illustrates a fragmentary cross-section of a high-loft batt of the present invention with integral skins. Internal construction is substantially the same as described with reference to FIG. 2. However, in this construction the outer most fibers 20 have been melt formed into integral skins 21 which as desired may be impervious to vapor or liquid, structural or formed and shaped for specific uses, for example, to facilitate connection to or to encompass building structures etc. The skin is shown formed on opposite faces of the batt, however, it will be appreciated that a skin of the desired properties may be formed on one face only and on as many edges as desired. Preferably the skin is of the same material as the fibers of the batt. However, skins formed of other materials, as desired, may be used and these may be integrally incorporated in the batt or rendered fast with the batt by other means (e.g. adhesives, etc.).

Thermal and physical performance of PET batts and boards is dependent on many factors including, material composition, internal and surface structure, degree of molecular orientation and/or crystallization, fiber diameter, fiber color, fiber shape and fiber interengagement/entanglement. A suitable combination of these, by comparison with fiber glass batts and boards, provide improved, for example:

1) R value per inch;
2) Dimensional stability;
3) Springback;
4) Resistance to delamination;
5) Stiffness;
6) Tensile strength;
7) Creep (Sag);
8) Shrinkage;
9) Burst strength (Resistance to Puncturing);
10) Toughness (resistance to cutting);
11) Thermal stability; and
12) Economy.

Figure 8:
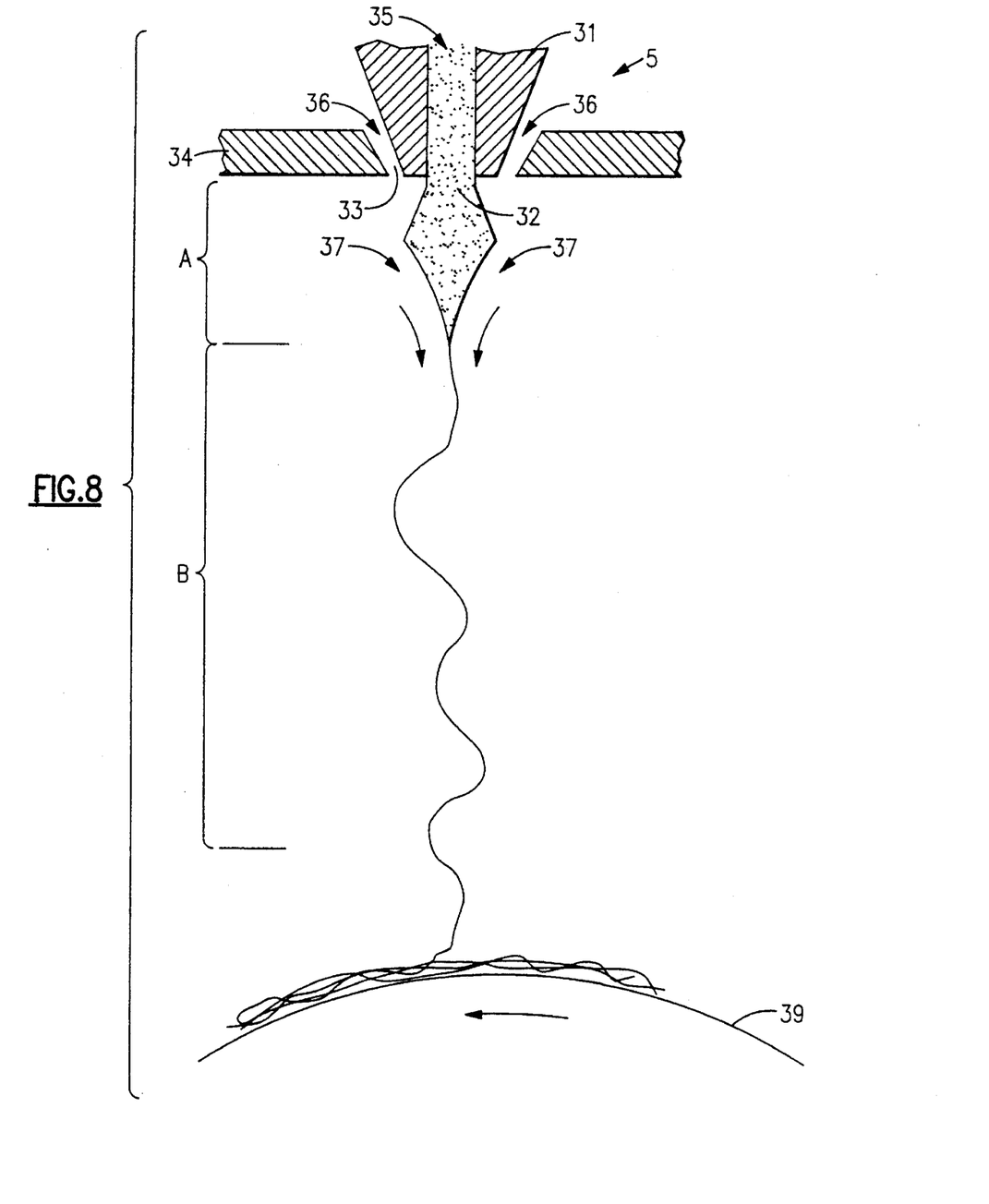
FIG. 8 diagrammatically illustrates the melt blowing process and resulting attenuation of the fibers.
Figure 11:
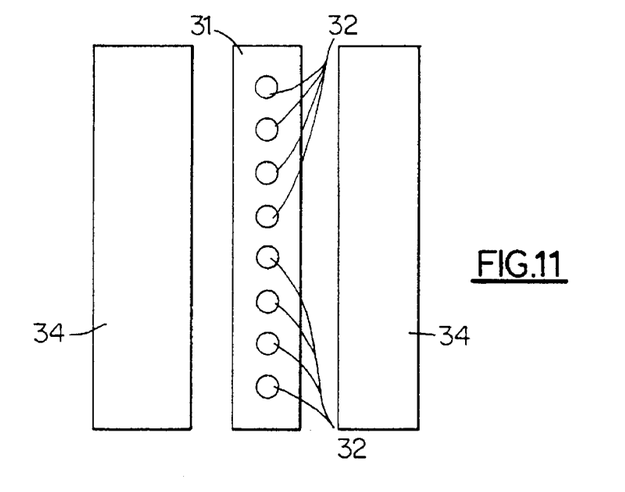
FIG. 11 is a diagrammatic bottom view of the extrusion head.

The substantially continuous fibers are formed by a melt blowing process diagrammatically illustrated in FIG. 8. According to the preferred embodiment of the invention, recycled PET made up of 40% reclaimed x-ray film mixed with 60% reclaimed post consumer bottles is dried, melted and fed, under a pressure of about 650 psi (approximately 2× the pressures used in the prior art) and at a temperature of about 650° F., to the melt blowing extrusion head 5. The molten PET 35 is forced through a row of orifices or apertures 32 in a die 31 at a rate of 0.1 lb/hour/aperture. The apertures 32 in the die 31 have a diameter of 14 mils and are spaced at 25 per inch along the row as shown in FIG. 11.

Pressurized heated air is also fed to the extrusion head from a plenum in which the air has a temperature of 665° F. The hot air is forced through 30 mil wide 50 inch long gaps 33 located on opposite sides of the die between the die 31 and external wall 34 of the extrusion head 5, thereby forming the high velocity, approximately 200 miles per hour, hot air used to impact the fibers on opposing sides. The gaps 33 are configured at an angle such that the high velocity air impacts the fibers at an angle of 30° and at a temperature of about 400° F. and attenuates the fibers. The gaps should be from 15 mil to 40 mil wide, preferably 30 mil wide, and the air should be heated to at least 100° F. above the melting temperature of the PET.

Figure 15:
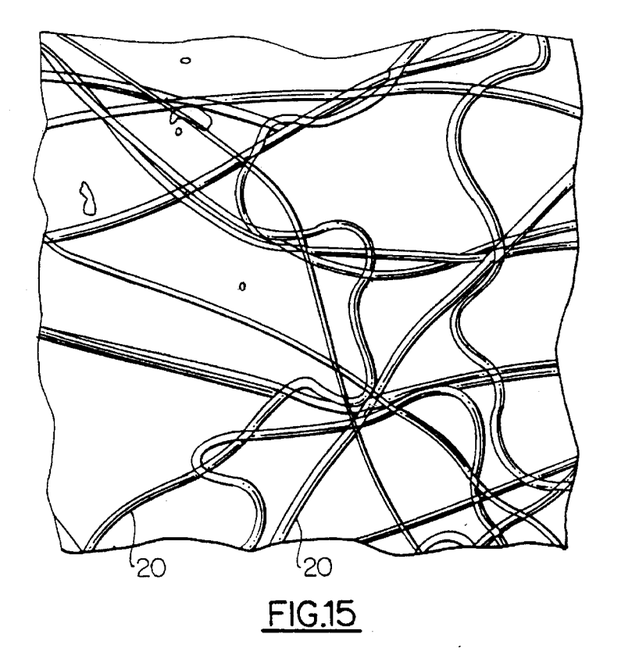

As the extruded polymer 35 exits the die 31, it is pulled and attenuated by the high velocity air 36 in an attenuation region A further narrowing the fibers. In a monoaxial orientation region B the high velocity air, now mixed with ambient air as shown by arrows 37, continues to attenuate and narrow the already fine fibers resulting in a monoaxial orientation of the fiber molecules forming substantially continuous and very small diameter fibers, as best shown in FIG. 15. In the monoaxial orientation B, the high temperature high velocity air 36 is being mixed with ambient air 37 thereby cooling the fiber. Therefore, while the molecules and the fibers are being monoaxially oriented and cooled in the B region, the fibers are crystallizing.

The high velocity air in regions A and B is extremely turbulent causing the fibers to be randomly bent, twisted and entangled with each other, as shown in FIGS. 2, 3a, 3b, 3c, and 13–15, and to be crystallized in this random bent and twisted shape thereby creating the desired Z-direction segments of the fibers. When the high velocity air reaches the gap 33, it is preferably at a temperature at least 100° F. above the melt temperature of the PET.

Crystallization is thermally produced and serves to improve most aspects of performance. Molecular orientation is produced mechanically and also serves to improve most aspects of performance. A combination of crystallization and molecular orientation generally produces a greater improvement than either one alone. One exception may be toughness where crystallization serves to improve cuttability while molecular orientation has the reverse effect.

PET mats of the present invention have substantially continuous fibers which may be all of the same composition or a mixture of fibers of different chemical compositions, diameters, cross-sectional shapes, colors, orientations, crystallinity, etc., depending upon the desired combination of thermal and physical characteristics of the product. In addition, mixtures of PET fibers and fibers of other polymers may be used. While not required for integrity, additives (e.g. flame retardants) or binders may be incorporated to provide particular performance characteristics.

An important feature of the mats of the present invention is the interengagement/entanglement of the fibers produced by providing orientation of fibers in the Z as well as the X and Y coordinate directions; the Z coordinate being normal to the width (X) and length (Y) of the mats (i.e. parallel to the thickness). Even relatively low levels of Z direction fiber orientation provide sufficient entanglement of fibers to provide delamination resistance, springback, compressive strength, dimensional stability, loft, improved thermal performance, etc. Desired results can be achieved with as little as 1% of fiber orientation being in the Z coordinate direction. Note: fiber orientation is considered to be in the Z direction at locations in which the length of the fiber lies at an angle greater than 15° relative to the X-14 Y plane. No single fiber lies entirely in the Z direction, rather only portions (segments) of fibers lie in that direction. The final geometry of the X, Y and Z plane fiber segments makes up the batt geometry allowing loft, density and most important insulation (thermal resistance).

Higher degrees of fiber entanglement are desirable, not only to provide the above features, but also to reduce conduction, provide more efficient use of materials, reduce dependence on or provide elimination of binders/additives (with the associated environmental advantages, improved R values, etc.), to improve thermal performance, and to reduce conduction effects through the fiber from one side of the batt to the other, sometimes referred to as thermal shorts.

Better R values are achieved for the first time with an increased degree of Z direction orientation of fibers because those fibers create the geometric structure (air spaces) necessary to entrap and restrict air movement. Too large a portion of the fibers in the Z direction creates inefficiencies of material usage while too little in the Z direction causes a loss of insulation value, insufficient resistance to crushing of the batt and less recovery of loft. Z direction fibers are desirably present in a range of 1 to 40% (preferably 5 to 30%) substantially evenly spaced throughout the batt. The large range is a factor based on the final density of the product. For a given fiber volume fraction, the density is inversely proportional to the Z direction fiber, i.e., as density increases less Z is created or allowed to remain.

The melt blowing process uses high velocity air impacting the fibers at an angle from either side and pushing/pulling fibers out of the orifice. As the high velocity air impacts against the fibers and against the stream of high velocity air coming from the other direction much turbulence is created in the high velocity air that bends, twists and entangles the fibers, see FIGS. 2, 3a, 3b, 3c and 13–15.

The high velocity air, along with the collection device design and vacuum control has a tendency to flatten the fibers 20 into micro-layers 22 that can be as few as 1 or 2 fibers thick, as illustrated in FIG. 3b, extending primarily in the X and Y directions when they impact upon the collection device 39. The ability to create the high loft is in one sense a method to counter-act that tendency and/or use the air velocity for our own purposes to help create the loft.

The high loft batt made during experimentation is composed of a multitude of micro-layers 22. Each micro-layer 22 has two or more fibers 20, the preponderance of which lie in the X and Y direction with portions in the Z direction. The Z direction fiber portions can have a multitude of different shapes including but not limited to: a) springs; b) standing wave; c) entanglement/knots (single fiber upon itself); d) Nodes (multiple fibers entangling together); e) straight vertical segments; f) fibrils. FIGS. 2 and 3b exemplify a typical segment with Z direction orientation.

The laying down of fibers having a Z direction orientation is achieved in the present invention, in several different ways by, for example:

1) allowing or encouraging fiber bounce, in the Z direction, during the laying down of the fibers, made possible by an absence of thermal bonding of the fibers ensured by laying down the fibers when at a temperature below their glass transition temperature (Tg);

2) generating electrostatic charges in the fibers as they are laid down;

3) controlling fiber forming die orientation positioning and alignment;

4) promoting and controlling air turbulence in the laydown environment;

5) producing appropriate molecular orientation of fibers;

6) creating appropriate fiber surface characteristics;

7) controlling fiber temperature at laydown;

8) controlling process parameters;

9) laying down fibers at an angle to the Z direction;

10) promoting standing waves;

11) stretching fibers during ejection and/or during 11) air transport to produce variations in material orientation;

12) inducing fibrillation of the fibers;

13) allowing shrink back of fibers during laydown;

14) crimping fibers before laydown; and/or 15) heating fibers selectively using, for example, a hot wire extending perpendicular to fiber flow direction prior to laydown. Z direction orientation of fibers can also be produced after laydown by, for example:

1) corrugating of the mat after formation;

2) mechanically pulling fibers in the Z direction;

3) selectively heating, e.g. with hot needles, to form "V" pockets of fibers; and/or 4) using eccentric needles on a collection device.

The Z direction fibers are created by forming the odd shapes listed above in several different methods which to a certain degree can be controlled and can thus be manipulated to control the quantity and quality of the shapes. The first method is by a phenomenon of extruded plastics called "free jet expansion (FJE)". This FJE occurs under certain process conditions such as melt temp, pressure, etc and die design. Essentially FJE is memory retained by molten plastic under pressure such that when the pressure drops to zero (upon extrusion) and when the fibers are substantially released from the strain put on them via the high velocity air some fibers will snap back into the Z direction (as would a stretched elastic). This snapback can be either a single fiber forming a shape (spring, curl or knot) or it can entangle with other fibers forming a node or entanglement/knot. A variation of this memory phenomenon is that some fibers form odd shapes such as a corkscrew upon extruding from the die. The shape is frozen in place by quenching the fibers after they are substantially released from tension. The quenching is performed by means of water and/or air quenching to a temperature below the Tg of the fibers.

Figure 9:
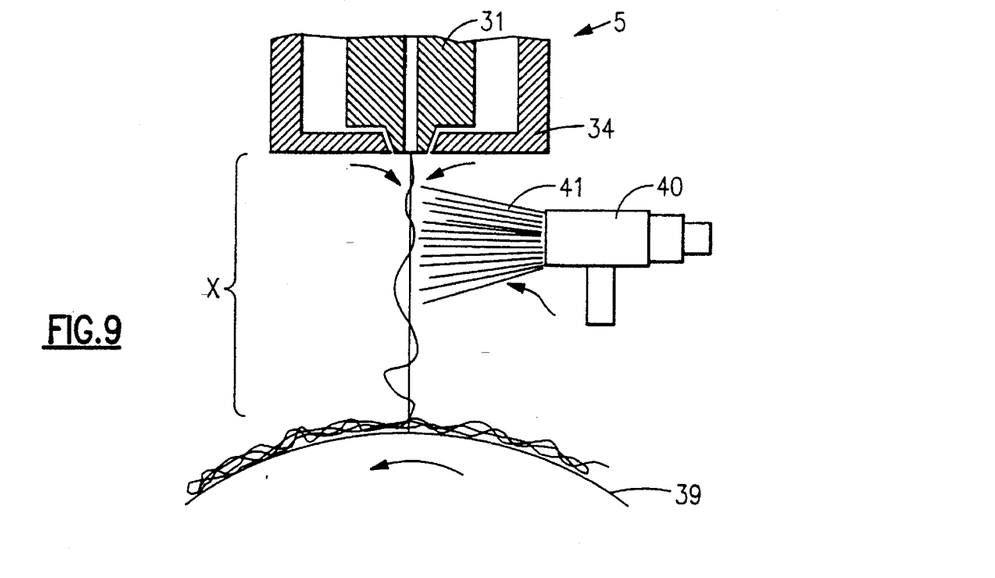
FIG. 9 diagrammatically illustrates the melt blowing process with differential cooling.

The second method of odd shape formation is caused by differential cooling illustrated in FIG. 9. The differential cooling of the fibers is achieved by spraying a mist 41 of cooling/quenching ambient (or cooler) water or other suitable fluid on one side of the fibers with a sprayer 40 soon after the fibers are extruded from the die. This causes a difference in stress radially through the fibers (i.e. from one side of the fibers to the other) which in turn causes bending and twisting of the fibers 20. Differential quenching rates are also created by variations in fiber diameter within individual and adjacent fibers. In order to spray the fibers soon after extrusion, the sprayer 40 is positioned 0–10 inches downstream from the die, preferably 6 inches, and 12 inches away from the stream of fibers.

Another method of creating Z direction fibers that has been noted is the bounce of the fiber as it impacts on the collection device or current layer. The air velocity normally knocks down the fibers into the X and Y directions. But in the present process, the fibers are deposited on the collection device at a temperature below their glassy transition temperature such that a small portion of the fibers bounce into and remain in the Z direction.

Z direction fibers are also created by imbalanced forces in the segments and/or portions of the fibers and/or fibrils which have different levels of orientation and memory which respond differently to the quenching. This imbalance creates the unusually chaotic effect and Z-direction including all the shapes described. Furthermore, the variations in the properties of the fibers and fibrils are exaggerated, (or enhanced as it leads to better properties), due to variations in melt viscosity and shear effects created which are related to the blends of materials of different melt viscosities, i.e. "recycled PET".

A further method is the turbulence created by the air used in the melt blowing process. Under the right process parameters (such as die to collector distance, air velocity, air temp, melt temp, etc.), Z direction fibers can be induced by the agitation generated by the air. This Z direction can be very disordered or semi-controlled such that standing waves are formed. The standing waves may be partial and or not uniform across the die tip. Increasing the amplitude of the standing waves would increase the Z-direction components.

A preferred method that was observed has to do with the phenomenon seen as "fibrillation". As background, the die diameters that were used in the trial were 370 microns (0.0145"). The final average fiber diameter achieved is on the order of 6 microns (0.000245"). The net reduction in diameter of the fiber (from the die but discounting die swell) to the average final fiber diameter is ~60 times. A portion of this reduction on the order of 5–15 x is attributable to fiber stretching which yields orientation. [Orientation described herein is monoaxial orientation such that the molecules of the fiber are essentially aligned in the axis of the fiber with little to no cross fiber structure.] Another portion of the fiber reduction is attributable to attenuation which is thinning (stretching) of the fiber but not orientating the molecules. The last portion of the reduction comes about as the individual strands of fibers 20 extruded from the die "fibrillate".

Figure 10:
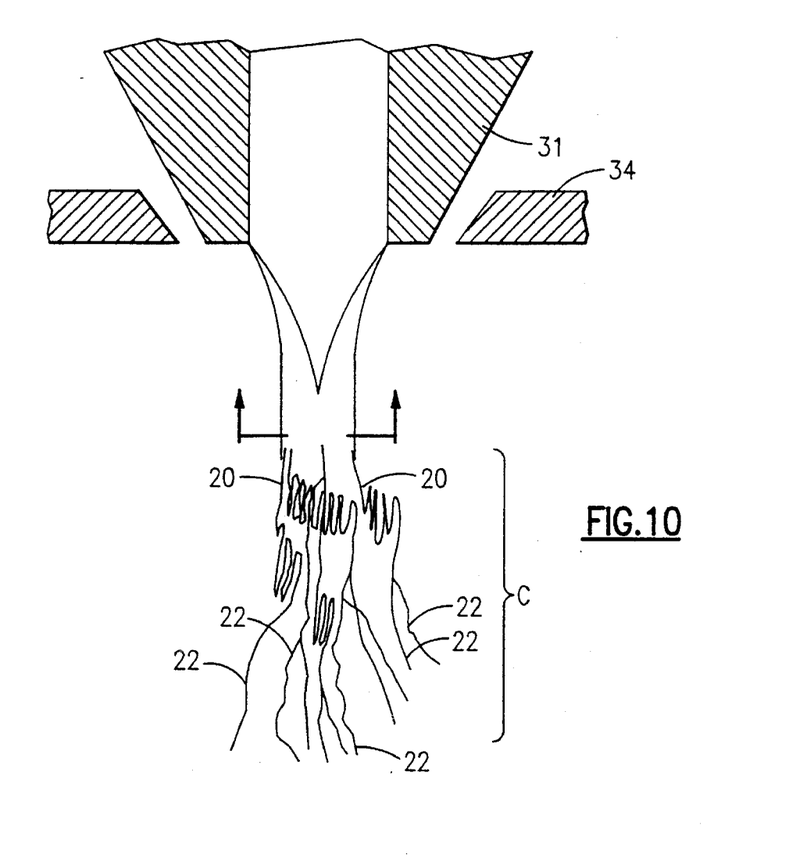
FIG. 10 diagrammatically illustrates the fibrillation of the fibers that occurs in the melt blowing process of the instant invention.

Fibrillation occurs when the fiber essentially splits along the axis of orientation (fiber length) into many (perhaps 40 to 50) independent fibers or fibrils 56 as diagrammatically illustrated in zone C in FIG. 10. The creation of fibrils 22 is in part due to differences in shear in the extrudate created by using blends of differing melt viscosities (recycled PET). This is the opposite direction of conventional fiber forming technologies where the focus is on doing everything possible to make the polymer uniform and create balanced forces.

While all process conditions are not clearly understood, some process conditions that do affect the fibrillation are:

- air velocity
- air temperature
- melt temperature
- melt pressure
- degree of stretching/attenuation of the fibers
- differences in molecular weight within the polymer stream.

It has been discovered that as the travel distance of the fibers 20, distance X shown in FIG. 9, between the extrusion head 5 and the collection device 39 is increased to a distance of 20 to 40 inches, preferably about 30 inches, a distance substantially greater than the 1–8 inches taught in the prior art melt blowing methods, the phenomena of fibrillation of the fibers occurs. As the fibers that have already been attenuated in the attenuation region A are continued to be stretched by the high velocity air and placed under a large strain, the fibers separate in a transverse direction into loosely connected fibrils 56 (see FIGS. 3c and 12).

The fibrils 56 tend to curl and twist and form extremely thin fibers of about 4 microns creating a structure similar to goose down. These extremely fine fibrils, analogous to goose down, tend to curl and twist in the Z-direction creating loft and greatly increase the R value of the batt. These fibrils also become entangled with the fibrils 56 from adjacent fibers 20, as shown in FIGS. 12–15. Thus the fibrils serve to entangle one micro layer of fibers with the next micro layer of fibers. In this way, individual micro layers of substantially continuous fibers of PET are separated and entangled by the corresponding fibrils.

Figure 12:
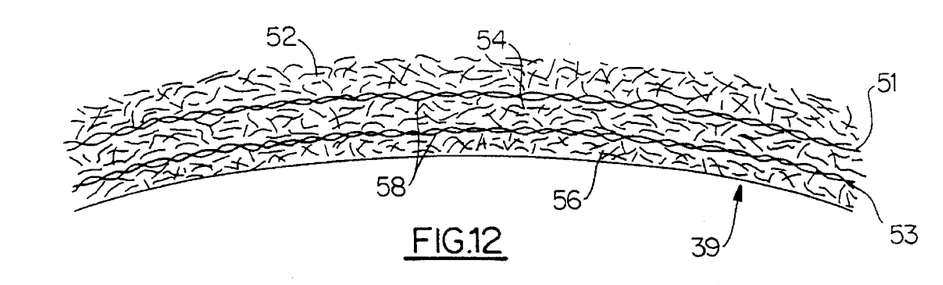
FIG. 12 diagrammatically illustrates the entanglement of the fibrils of adjacent micro-layers.

As diagrammatically illustrated in FIG. 12, after a first micro layer 53 comprised of one or more, substantially continuous fibers 58 is deposited on the collection device 39 a second micro layer 51 is deposited on top of a first micro layer 53. The fibrils 52, 54 and 56 extending from the micro layers serve to create loft between adjacent micro-layers and separate the two micro layers 51 and 53. The fibrils 54 between micro layers, as shown in FIG. 12, become entangled, thereby entangling the two micro layers 51 and 53 together creating structural integrity of the mat. The goose down like fibrils serve to greatly enhance the R value of the batts.

The increased travel distance X for the fibers between the extrusion head 5 and the collecting device 39, creates a longer travel time for the fibers traveling from the die to the collection device. This increased amount of time, in which the attenuated fibers are continually under strain from high velocity air, is thought to supply the extra amount of time necessary for the fibers to fibrillate under the strain created by the high velocity air.

Each of these finer fibers exhibits the characteristics described above for orientation, shape formation, etc.

The manufacturing processes allow control of mat cross-section shape and dimensions. For example, the thickness of a mat can be varied, as desired, across its width, to provide lateral areas of greater or less thickness, during laydown of the fibers.

Dimensional control is facilitated by hot cutting to provide precise dimensions coupled with the skin formation discussed hereinafter.

Dimensional control of mat thickness can be provided by hot calendaring and/or by crush calendaring.

Figure 4B:
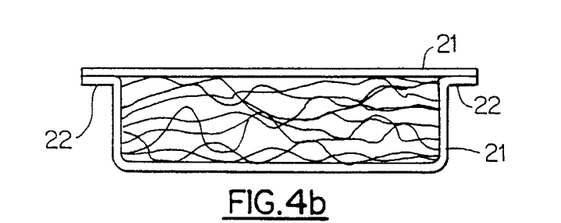

FIGS. 4a and 4b diagrammatically illustrate a cross-section of a batt of the present invention with integral skins formed to provide sealed batt edges with mounting flanges 22 at which the skins are thermally sealed together.

An integral surface skin can be readily formed during fiber laydown or during post mat forming processing.

During laydown, a skin can be formed by the use of a hot platen or roller to melt the first to be laid fibers. A second skin may also be formed during laydown by the use of a separate die set to provide fibers at the necessary skin forming temperature when they contact the nearly formed mat.

Post mat forming of a skin on one or both faces of the mat may be achieved by hot calendaring (e.g. using ceramic calendaring rolls) to re-melt surface fibers. This process can be used not only to form a planar skin or skins but also to provide areas of different mat thickness, for example, to provide mat edge flanges comprised primarily of skin structure. Especially in the case of batts, shaped grooves defined by the skin and adapted to engage or encompass structural components (such as studs) can be provided. Such arrangements can be combined with the extension of portions of the PET batt over structural components to eliminate thermal shorts and to provide additional insulation without the cost of enlarging these structural components.

Figures 5, 6, 7:
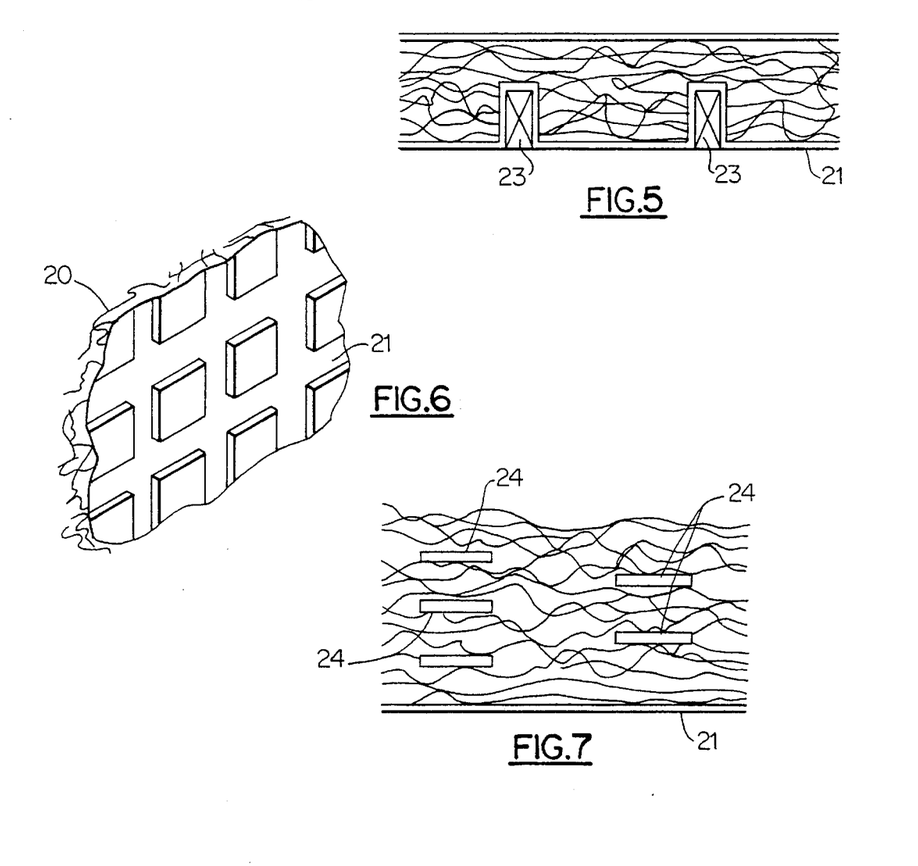
FIG. 5 is a fragmentary cross-section of a batt of the present invention having an integral skin formed to partially encompass structural components.
FIG. 6 diagrammatically illustrates a waffled integral skin of a batt of the present invention.
FIG. 7 diagrammatically illustrates a fragmentary cross-section of a reinforced batt of the present invention.

FIG. 5 is a diagrammatic illustration of a fragmentary cross-section of a batt of the present invention in which an integral skin 21 is formed to closely encompass studs 23 of a wood building frame. The application of such batts to a plurality of stud spaces is greatly facilitated by the shaped skin arrangements that are easily achieved in this construction.

The skin can be of any desired thickness and can be designed to provide structural support (e.g. against racking loads) and may be able to replace plywood sheathing. A corrugated or waffled skin form can be produced to provide increased stiffness in the X, Y or X and Y directions.

FIG. 6 diagrammatically illustrates a waffled integral skin of a batt of the present invention to impart structural strength to the batt.

Heat setting of fibers in the mat may be used to increase or provide crystallinity with resultant improvements in thermal stability. Heat setting is not required for hot water pipe-wrap insulation (which may have a skin formed on the outer circumference thereof and, if desired, also on the inner circumference and mating edges of split wrap). However, for higher temperature applications (hot oil, steam, etc.), heat setting is able to provide a stable insulating structure.

Ducting with superior performance is possible using the PET mats here proposed. Such ducting may be formed with an integral internal, and if desired an integral external, skin to provide performance superior in every respect to fiber-glass mat ducting. The PET mat ducting reduces airflow friction, increases resistance to mildew and bacterial incubation and eliminates airborne fibers escaping from the duct material—a problem causing ever increasing environmental and health concerns with fiberglass.

Compression Molding to almost any shape is readily achieved by:

1) shaping during laydown;

2) hot molding after mat formation to weld fibers together to form the desired shape; and/or 3) shaping the integral skin or skins.

A wide range of applications can be addressed by molding, such as, automobile thermal and acoustical pads (e.g. hood pads).

PET mats and their integral skins may be combined or laminated with other materials which may be perforated or otherwise processed prior to lamination. Lamination may be during laydown of the PET fibers or as a post forming operation preferably without the use of adhesives. During laydown, lamination may be achieved by extending the fiber entanglement into the lamina of other material, e.g. when using lamina of a non-woven or perforated material.

Such laminated products could enhance puncture (burst) resistance, tear strength, racking strength (tensile in the x, y plane), structural strength and resistance to air permeation, vapor permeation, water transmission and transmission or attack by chemicals, etc.

Reinforcement, particularly of PET boards, is provided by the integrally formed skins already referred to and may be enhanced by reinforcement structures formed by welding selected fibers together internally of the mat during laydown. This is achieved by, for example, providing pulses of heat energy to melt fibers together in chosen regions of the mat during laydown of the fibers.

FIG. 7 diagrammatically illustrates a fragmentary cross-section of a batt of the present invention with an integral skin 21 on one face only and incorporating internal integral reinforcements 24.

PET non-woven fiber mats are produced by melt-blowing equipment in which the melted material is forced through a plurality of extrusion dies to form substantially continuous fibers which are then carried by a high-velocity gas to a fiber mat forming location at which the fibers are laid down with appropriate entanglement to produce desired mat integrity.

To produce insulating batts and boards, a plurality of die arrays are arranged over the mat forming location to progressively produce the desired mat configuration as it is conveyed under this plurality of arrays.

As the fibers are created from the dies they are collected on a collection device, and a layer of fibers is formed.

In the specific test conducted, a rotating drum rotating at a speed of 24 RPM (15 ft/min peripheral linear speed) was used as a collection device. The fibers were collected for a time range of 6–10 minutes. Each rotation of the drum created a micro-layer that is one or two fibers thick and is built up on the previous layer thus the high loft batt is actually composed of a multitude of micro-layers.

Other suitable collection devices other than rotating drums can be used including flat or contoured conveyors. Alternatively, the layer could be built up by moving a conveyor back and forth under the extrusion head. During the melt blowing process the molten PET should be pressurized to a pressure from about 300 psi to 1200 psi, preferably 650 psi, and the air should be heated to a temperature at least 100° F. above the melting temperature of the PET or other thermoplastic being used.

What is important to note is that each layer attaches to the layers immediately above and below it (except for the top and bottom layers) which creates spacing and loft so that, in fact, 88 layers would not be needed but a smaller number. Combining the depth of the layers and the space created provides a total height per layer ranging from approximately 0.020" to 0.150" (See FIG. 12).

The layer to layer attachment is by the same mechanism that creates the depth of the layers, i.e., different shape fibers that form a 3-D structure which intertwine and tangle with adjoining layers. Due to air turbulence, a small but effective portion of the bottom layer fibers are actually mixed with those fibers forming the next layer thus creating the noted spacing and adhesion between layers preventing delamination.

Most importantly, the fibers with Z direction orientation help create the geometric structure of the batt. By creating the air spaces in this 3 dimensional structure combined with fine fiber diameter, the highest insulation values are achieved.

The die shapes and distribution coupled with the arrangement of the arrays are used to:

1) lay down fibers which may, depending on the application, differ as to material, cross-sectional shape and size, crystallinity, molecular orientation, color, density, etc.;

2) allow secondary processing between the arrays (e.g. electrostatic charge application to produce Z direction fiber orientation, application of flame retarders, etc.);

3) control matt shape; and/or 4) vary array application angles to produce Z direction fiber orientation.

Hot wire knives are contemplated for cutting. However, with highly crystallized mats fracturing of fibers by cutting (fracturing) as with fiberglass may be possible.

Apart from cutting, no unusual installation problems are expected. In fact, the ability to form the integral skin, in many configurations, significantly adds to the ease and versatility of installation in many standard situations and will greatly enhance installation in custom or advanced building systems.

This is achieved using standard practice in fiber batt technology.

What is claimed is:

1. A thermal insulation comprising a high loft non-woven mat comprising substantially continuous, entangled, linear condensate polymer fibers extending primarily in the X and Y directions of an X, Y, Z coordinate system, with at least some portions of individual said fibers extending in the Z direction, the fibers having diameters of from about 1 to about 15 microns, and individual said fibers having split or splayed sections along their length forming fibrils integrally extending from these fibers, said fibrils having diameters which are less than the diameters of said fibers;

said mat being comprised of multiple layers of the fibrils and fibers, at least a portion of said fibrils extending in the Z direction from each layer of fibers, these Z direction fibril being in contact with and entangled with fibrils extending from adjacent layers of fibers to define a layer of entangled fibrils between the adjacent layers of fibers that interconnects and spaces the adjacent layers of fibers;

the mat having an R value, in the Z direction, of at least 3.5 per inch and a density of from about 1 to about 3 lbs/ft$^3$; and wherein, all integrity, loft, resilience and dimensional stability of the mat required for use as thermal insulation is provided solely by structure consisting essentially of:
   i) physical properties of the linear condensate polymer;
   ii) the entanglement of the fibrils and fibers with other said fibrils and fibers; and
   iii) interaction of the portions of the fibers which extend in the Z direction with other said fibers.

2. Insulation as in claim 1 comprising an additive incorporated therein to provide a desired performance characteristic.

3. A thermal insulation as in claim 1, wherein the mat, in the Z direction, has an R value of at least 4 per inch.

4. A mat as in claim 3, wherein the mat, in the Z direction, has an R value of at least 4 per inch.

5. A thermal insulation as in claim 1, wherein the mat, in the Z direction, has an R value of at least 4.5 per inch.

6. A thermal insulation as in claim 1, wherein each of the multiple of layers of the fibrils and fibers has a thickness of one to two said fibers.

7. A thermal insulation as in claim 1, wherein each of the multiple of layers of the fibrils and fibers has a thickness of from about 0.02 inches to about 0.15 inches.

8. A high loft non-woven mat, suitable for use as thermal insulation, consisting essentially of linear condensate polymer in the form of substantially continuous, entangled fibers that extend primarily in the X and Y directions of an X, Y, Z coordinate system with at least some portions of individual said fibers extending in the Z direction, the fibers having diameters of from about 1 to about 15 microns;

wherein individual said fibers have split or splayed sections along their length which form fibrils extending from the fibers and integral therewith, the fibrils having diameters which are less than the diameters of the fibers;

said mat is comprised of multiple layers of the fibrils and fibers, with at least a portion of the fibrils extending in the Z direction from each layer of fibers, these Z direction fibrils being in contact with and entangled with fibrils extending from adjacent layers of fibers to define a layer of entangled fibrils, between adjacent layers of fibers, that interconnects and spaces the adjacent layers of fibers;

the mat, in the Z direction, having an R value of at least 3.5 per inch and a density of from about 1 to about 3 lbs/ft$^3$; and wherein the loft, structural integrity, resilience, and compressive, tensile and burst strength of the mat required for use as thermal insulation are provided solely by:
 a) physical properties of the linear condensate polymer;
 b) the entanglement of the fibrils and fibers; and
 c) interaction of the portions of the fibers which extend in the Z direction.

9. A mat as in claim 8, wherein the mat, in the Z direction, has an R value of at least 4.5 per inch.

10. A mat as in claim 8, wherein each of the multiple of layers of the fibrils and fibers has a thickness of one to two said fibers.

11. A mat as in claim 8, wherein each of the multiple of layers of the fibrils and fibers has a height of from about 0.02 inches to about 0.15 inches.

12. A mat as in claim 8 wherein the portions of the fibers extending in the Z direction are from about 1% to about 40% of each individual fiber.

13. A mat as in claim 12 wherein the portions of the fibers extending in the Z direction are from about 5% to about 30%, and the Z-direction portions are substantially evenly distributed throughout the mat.

14. A mat as in claim 8, wherein said linear condensate polymer is recycled polyethylene tetraphthalate.

15. A mat according to claim 14, wherein said PET is recycled PET comprising about 40% reclaimed X-ray film and about 60% reclaimed post consumer bottles.

16. A mat as in claim 8, wherein said fibers have a circular cross-section with a diameter from about 3 microns to about 15 microns.

17. A mat as in claim 8, having a skin on at least one side of said mat, said skin being fast with said mat.

18. A mat as in claim 17, wherein said skin is on opposite sides of said mat.

19. A mat as in claim 17, wherein said skin is on at least one edge of said mat.

20. A mat as in claim 17, wherein said skin is formed of the same material as the fibers from which the mat is constructed.

21. A mat as in claim 20, wherein said skin is integral with said mat.

22. A mat as in claim 17, wherein said skin is contoured to at least partially encompass an element to which the insulation is to be applied.

23. A mat as in claim 22, wherein said skin is contoured to at least partially encompass wall studs of a framed structure.

24. A mat as in claim 8 in combination with an additive incorporated therein to provide a desired performance characteristic.

25. A mat as in claim 24, wherein said additive is a fire retardant.

* * * * *